May 7, 1935.  F. W. PEISCH  2,000,535
GAUGE
Filed Sept. 18, 1933
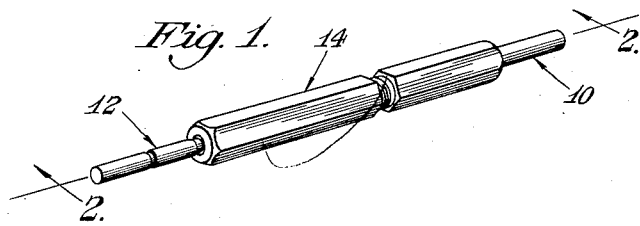
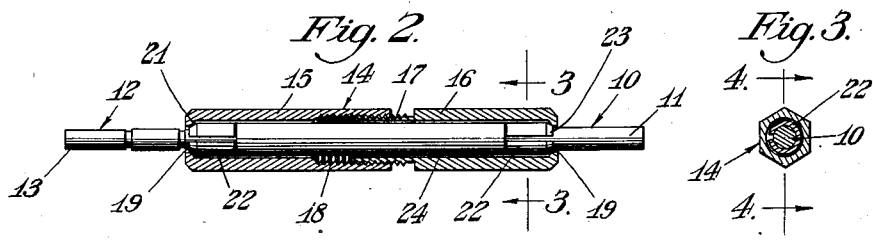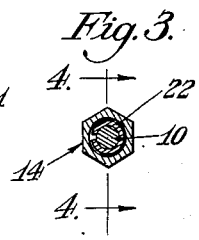
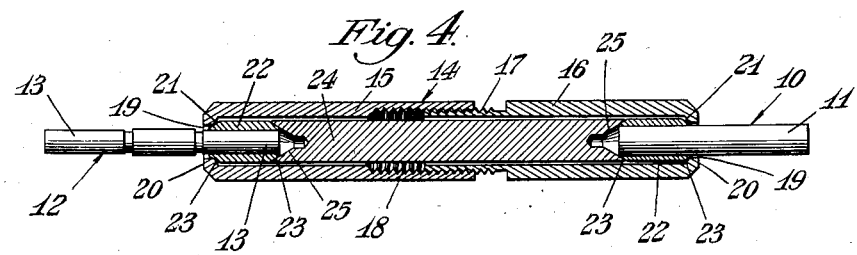
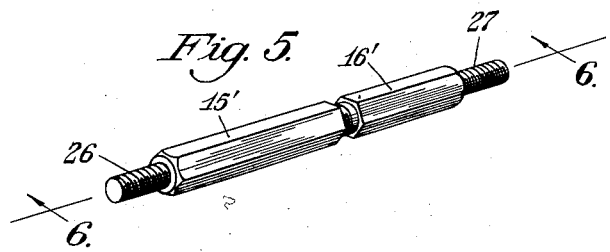
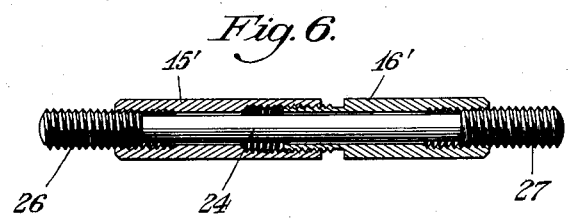
Fred W. Peisch
Inventor
Threedy and Cannon
His Attorneys Patented May 7, 1935

2,000,535

UNITED STATES PATENT OFFICE 2,000,535

GAUGE

Fred W. Peisch, Chicago, Ill.

Application September 18, 1933, Serial No. 689,927

1 Claim. (Cl. 33—178)

This invention relates to gauges and more particularly to that class of gauges known in the art as plug and thread gauges.

An object of this invention is the provision of a gauge of the type hereinbefore referred to, which is of a design and construction as will permit economical manufacture and assured durability and usefulness for the intended purposes.

Contemporaneous with this and other objects hereinafter recited is also that of providing a holder, for gauge members, of a character which while including an arrangement for effectively mounting the gauge members in proper detachably secured position with respect to the holder and which will permit expeditious removal of such gauge members from said holder without the necessity of dismantling the parts comprising the holder.

Another object contemplated by the invention is to provide a gauge of a character which will permit the reversibility of the gauge members proper.

A further object resulting from the conception of my invention resides in the provision of a gauge member which consists of relatively few parts thereby resulting in simplicity in construction and consequently economy in manufacture and efficiency in use.

Other objects will appear hereinafter.

The invention consists in the novel combination and arrangement of parts to be hereinafter described and claimed.

The invention will be best understood by reference to the accompanying drawing illustrating the preferred embodiments of my invention and in which:

Fig. 1 is a perspective view of the gauge embodying my invention;

Fig. 2 is a sectional detail view of the same taken substantially on line 2—2 of Fig. 1;

Fig. 3 is a sectional detail view of the same taken substantially on line 3—3 of Fig. 2;

Fig. 4 is a sectional detail view of the same taken substantially on line 4—4 of Fig. 3;

Fig. 5 is a perspective view of the invention illustrating a modified form of construction; and Fig. 6 is a sectional detail view of the same taken substantially on line 6—6 of Fig. 5.

To fully comprehend the utility and the advantages of my gauge over those now commercially in use, attention is first invited to Figs. 1-4 inclusive, wherein a preferred embodiment of my invention is illustrated.

In this connection a gauge member is indicated at 10 and this gauge member may have either of its outer end portions 11 detachably secured to the holder hereinafter referred to.

Another gauge member is indicated at 12 and this gauge member may likewise have either of its end portions 13 detachably secured to the holder hereinafter described.

With reference to this gauge member 12, this gauge member is well adapted for use as a "go and no-go" gauge member by making the intermediate portion thereof a few thousandths of an inch larger in diameter than the outer end portions indicated at 13.

The holder for supporting the gauge members 10 and 12 in operative position is indicated at 14 and includes sleeve members 15 and 16 adjustably connected together in alignment with respect to each other by a thread bearing stud 17 adapted for threaded engagement with the thread bearing end portion 18 of the sleeve 15 as best shown in Figs. 2 and 4. The opposite outer end portions of the sleeves 15 and 16 are provided with openings 19 through which the end portion of the gauge members are projected into the interior of the holder 14, and these openings are defined by end portions of the sleeves 15 and 16 providing shoulders 20 having slightly bevelled inner surface portions 21 for reasons which will be hereinafter more apparent.

Removably arranged within the holder at opposite ends thereof and adapted to embrace the end portions of the gauge members projected into the sleeves are chuck members 22 in the form of split rings, each having their opposite end portions bevelled as at 23.

A movable binder rod is indicated at 24 and this rod is arranged within the holder in the manner shown in the drawing. This rod has its outer end portions provided with counter-sunk portions having bevelled edges 25 for reasons which will be hereinafter more apparent.

In assembling the gauge members 10 and 12 in position with respect to the holder 14 the chuck members 22 are disposed in the outer end portions of the sleeves with their bevelled end portions 23 in contact with the bevelled surfaces 21 of the shoulders 20. The rod 24 is mounted within the holder with its bevelled counter-sunk portions 25 in engagement with the adjacent bevelled end portions of the chuck members. The end portions of the gauge members are projected into the chuck members. These end portions are caused to grip the end portions of the gauge members 10 and 12 by the rotation of the sleeves in opposite directions with respect to each other, which rotation of the sleeves causes the binder rod 24 to bear against the chuck members 22 and bear these chuck members 22 against the stop shoulders 20, which action by virtue of the bevelled edges hereinbefore recited effectuates a gripping relation between the chuck members and the end portions of the gauge members. This action consequently results in the chuck members securely holding the gauge members in fixed position with respect to the holder 14.

To remove either or both of the gauge members, the sleeves 15 and 16 are rotated in an opposite direction to that hereinbefore recited. This will reduce the pressure of the binder rod 24 against the chuck members 22 and consequently permit these chuck members to release their grip upon the adjacent end portion of the gauge members and thereby permit either or both of these members to be expeditiously removed.

It may be desirable for economical purposes or by virtue of necessity that the gauge be designed to support but a single gauge member. When this is the case the gauge hereinbefore described may be constructed with one of the sleeves provided with a closed end portion in which case this closed end portion will bear against the binder rod when the sleeves are adjusted to secure the gauge member in the opposite end portion of the holder.

This may also be accomplished by providing a "dummy" chuck member in either of the sleeves 15 or 16.

Referring now particularly to Figs. 5 and 6 illustrating another embodiment of my invention the gauge therein illustrated includes the sleeves 15' and 16' connected together in substantially the same manner as the sleeves 15 and 16. This gauge member is designed and adaptable for supporting thread gauges 26 and 27, and in lieu of connecting these thread gauges to the sleeves 15' and 16' through the medium of chuck members the outer end portions of the sleeves 15' and 16' are tapped to provide interior thread bearing surfaces. Into these thread bearing end portions of the sleeves 15' and 16' are threaded corresponding end portions of the thread gauges 26 and 27. These thread gauges 26 and 27 which are capable of reversibility are latched against rotation by the latch rod 24', the ends of which bear against adjacent ends of the thread gauges upon adjustment of the sleeves 15' and 16' relatively to each other.

It may be desirable that the gauge embodying my invention include at one end the structure shown at either end of the gauge illustrated in Figs. 5 and 6 and at the other end the structure illustrated at either end of the gauge illustrated in Figs. 1-4. This may be accomplished by mere substitution without departing from the spirit of my invention.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A gauge holder comprising coaxially arranged sleeves having threaded interconnection for adjustment axially relative to each other; each of said sleeves having a bevelled annular shoulder formed integrally therewith on its inner peripheral surface and at its axially outer end; a chuck mounted in each of said sleeves and each of said chucks having engagement at its axially outer end with the corresponding one of said shoulders; each of said chucks having a bevelled axially inner end portion; and a solid cylindrical rod arranged in, and extending between, said sleeves and having opposite end portions projecting a substantial distance into said sleeves; said rod having its axially outer end portions bevelled for abutting engagement with the said bevelled axially inner end portions of said chucks; and said rod having recesses formed in its axial ends for the reception of the inner end portions of gauge members projected thereinto through said sleeves and chucks.

FRED W. PEISCH.